United States Patent
Liu et al.

(10) Patent No.: US 12,500,449 B2
(45) Date of Patent: Dec. 16, 2025

(54) WIRELESS CHARGING APPARATUS AND TERMINAL USING SAME

(71) Applicant: Huawei Technologies Co., Ltd., Shenzhen (CN)

(72) Inventors: Qitang Liu, Shenzhen (CN); Ce Liu, Dongguan (CN); Weiliang Shu, Dongguan (CN); Yanding Liu, Dongguan (CN); Pinghua Wang, Shenzhen (CN); Yong Cao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 1302 days.

(21) Appl. No.: 17/113,328

(22) Filed: Dec. 7, 2020

(65) Prior Publication Data

US 2021/0091599 A1    Mar. 25, 2021

Related U.S. Application Data

(63) Continuation of application No. PCT/CN2018/090374, filed on Jun. 8, 2018.

(51) Int. Cl.
*H02J 50/10* (2016.01)
*H02J 50/05* (2016.01)
*H02J 50/40* (2016.01)
*H02J 50/80* (2016.01)
*H02J 50/90* (2016.01)

(52) U.S. Cl.
CPC ............ *H02J 50/10* (2016.02); *H02J 50/402* (2020.01); *H02J 50/80* (2016.02); *H02J 50/90* (2016.02); *H02J 50/05* (2016.02)

(58) Field of Classification Search
CPC .......... H02J 50/005; H02J 50/05; H02J 50/10; H02J 50/12; H02J 50/402; H02J 50/80; H02J 50/90; H02J 7/0048; H02J 7/00712; H02J 7/007182; H02J 7/04
See application file for complete search history.

(56) References Cited

U.S. PATENT DOCUMENTS

| | | | | |
|---|---|---|---|---|
| 9,893,619 | B2 * | 2/2018 | Kihara | H02M 3/158 |
| 10,277,061 | B1 * | 4/2019 | Kerselaers | H02J 50/80 |
| 2002/0097543 | A1 * | 7/2002 | Pannwitz | H02J 7/0031 |
| | | | | 361/90 |
| 2004/0166387 | A1 * | 8/2004 | Imamura | H01M 8/04753 |
| | | | | 429/513 |
| 2008/0169706 | A1 * | 7/2008 | Onishi | H02J 7/00045 |
| | | | | 320/108 |

(Continued)

FOREIGN PATENT DOCUMENTS

| | | |
|---|---|---|
| CN | 101860206 A | 10/2010 |
| CN | 104919672 A | 9/2015 |

(Continued)

*Primary Examiner* — Jack Chiang
*Assistant Examiner* — Aric Lin
(74) *Attorney, Agent, or Firm* — Conley Rose, P.C.

(57) ABSTRACT

A wireless charging apparatus includes a receive end coil, a switch selection circuit, a plurality of charging circuits, and a receive end controller. An input end of the switch selection circuit is connected to an output end of the receive end coil, and an output end of the switch selection circuit is connected to an input end of each of the charging circuits.

20 Claims, 8 Drawing Sheets

(56) References Cited

U.S. PATENT DOCUMENTS

| | | | |
|---|---|---|---|
| 2009/0102291 A1* | 4/2009 | Mazumder | H02J 7/34 307/80 |
| 2012/0169137 A1 | 7/2012 | Lisi et al. | |
| 2013/0076301 A1* | 3/2013 | Bastami | H02J 7/00041 320/162 |
| 2014/0084851 A1* | 3/2014 | Park | H02J 7/007182 320/160 |
| 2015/0236517 A1 | 8/2015 | Deguchi et al. | |
| 2015/0340881 A1 | 11/2015 | Nakano et al. | |
| 2015/0364982 A1* | 12/2015 | Chae | H02M 3/157 323/299 |
| 2016/0204643 A1 | 7/2016 | Manova-Elssibony | |
| 2016/0254689 A1* | 9/2016 | Lee | H02M 3/158 320/107 |
| 2016/0254696 A1 | 9/2016 | Plumb et al. | |
| 2016/0268833 A1 | 9/2016 | Lee et al. | |
| 2017/0129348 A1* | 5/2017 | Jang | B60L 53/11 |
| 2017/0331317 A1 | 11/2017 | Wheeland et al. | |
| 2019/0036354 A1 | 1/2019 | Liu et al. | |

FOREIGN PATENT DOCUMENTS

| | | |
|---|---|---|
| CN | 105637727 A | 6/2016 |
| CN | 105932725 A | 9/2016 |
| CN | 106374578 A | 2/2017 |
| CN | 206117963 U | 4/2017 |
| CN | 106786899 A | 5/2017 |
| CN | 106786905 A | 5/2017 |
| CN | 105226779 B | 6/2017 |
| CN | 107231012 A | 10/2017 |
| CN | 206742932 U | 12/2017 |
| EP | 2665153 A2 | 11/2013 |
| JP | 2014197935 A | 10/2014 |
| WO | 2017184083 A1 | 10/2017 |

\* cited by examiner

WIRELESS CHARGING APPARATUS AND TERMINAL USING SAME

CROSS-REFERENCE TO RELATED APPLICATIONS

This application is a continuation of International Patent Application No. PCT/CN2018/090374, filed on Jun. 8, 2018, which is hereby incorporated by reference in its entirety.

TECHNICAL FIELD

Embodiments of the present disclosure relate to the circuit field, and more specifically, to a wireless charging apparatus and a terminal using same.

BACKGROUND

In the wireless charging field, and in particular, in the wireless charging field for mobile phones, wireless charging power, namely, charging duration or a charging speed, affects wireless charging experience. Theoretically, wireless charging manufacturers may increase wireless charging power by increasing an input power source, increasing an output voltage of a converter, or the like. However, wireless charging power in other approaches is basically less than 10 watts (W), leading to a relatively long charging time and relatively poor user experience. For example, a 2716 milliamp hours (mAh) battery is used for IPHONE X with a maximum of 7.5 W wireless charging power, and more than 200 minutes are needed to fully charge the battery. This is because if the wireless charging power is simply increased, various safety problems such as overheating, battery life reduction, battery damage, and even explosion are caused. Therefore, many manufacturers are still studying how to safely and effectively improve wireless charging power, but no significant research achievement has been made.

A bottleneck in increasing the wireless charging power is efficiency of a charging circuit inside a mobile phone, and excessively low efficiency causes severe overheating. In an actual application, when the wireless charging power is relatively high, a corresponding mechanism is further needed to ensure safety of the mobile phone. During high-power charging, if a mobile phone and a charging transmit end are not aligned or have an offset due to a movement, a coupling coefficient between the mobile phone and a charging board changes and therefore low charging efficiency, overheating, or the like are prone to occur.

SUMMARY

Embodiments of the present disclosure provide a wireless charging apparatus and a terminal using same, to improve a wireless charging speed and ensure charging efficiency and safety.

According to a first aspect, an embodiment of the present disclosure provides a wireless charging apparatus, where the apparatus is located in an electronic device such as a terminal or an electric vehicle and configured to receive energy sent by a transmit end coil of a wireless charging transmit end, to charge a battery or to supply power to a load such as a power consumption component. The wireless charging apparatus includes a receive end coil, a switch selection circuit, M charging circuits, and a receive end controller. An input end of the switch selection circuit is connected to an output end of the receive end coil, and an output end of the switch selection circuit is connected to an input end of each of the M charging circuits. Charging power of the M charging circuits is different from each other, and an output end of each of the M charging circuits is configured to connect to the load of the electronic device. The receive end controller may obtain a coupling coefficient between the receive end coil and the transmit end coil, and control, based on the coupling coefficient, the switch selection circuit to select N of the M charging circuits to connect to the receive end coil, where M is an integer greater than or equal to 2, and N is an integer greater than or equal to 1 and less than or equal to M.

As described above, the wireless charging apparatus can accurately determine, in real time based on a current coupling status between a transmit end coil and a receive end coil, whether fast charging can be performed, and can accurately and effectively configure a magnitude of a charging current of the wireless charging apparatus or of a supply current of the load by selecting and conducting charging circuits with different power, thereby obtaining higher wireless charging efficiency and supporting higher charging power. When a status of a wireless charging system changes, for example, when a charging device moves in a charging process, the wireless charging system may switch a charging path in time, to ensure wireless charging efficiency and uninterrupted transmission, thereby ensuring charging efficiency and safety while improving a wireless charging speed.

In a possible implementation of the first aspect, the load includes a battery, and the receive end controller is specifically configured to control, based on the coupling coefficient and an obtained battery parameter, the switch selection circuit to select N of the M charging circuits to connect to the receive end coil, where the battery parameter includes a battery level or a battery voltage. When the wireless charging apparatus is configured to supply power to a pure power consumption component such as a display screen, a communications module, a circuit mainboard, or a processor, the battery parameter does not need to be considered. However, if the wireless charging apparatus involves battery charging, proper charging power and a proper charging path need to be selected based on the coupling status and in combination with the battery level, the battery voltage, and the like, to avoid a phenomenon such as battery damage, overheating, or overcharging caused by a decrease in charging efficiency of the battery.

In a possible implementation of the first aspect, different coupling coefficients used to reflect the coupling status between the receive end coil and the transmit end coil may include mutual inductance between the transmit end coil and the receive end coil, or a real part of equivalent impedance that is reflected by the wireless charging apparatus as a receive end in the wireless charging system to a transmit end in the wireless charging system. The receive end controller is specifically configured to control, based on a magnitude of the mutual inductance or the equivalent resistor and the battery parameter, the switch selection circuit to select N of the M charging circuits to connect to the receive end coil. The foregoing different coupling parameters need to be obtained by obtaining different charging parameters for the wireless charging system in which the wireless charging apparatus is located. Different coupling parameters may be selected and determined based on different cases, for example, different difficulty in obtaining the charging parameters, to determine a coupling status.

In a possible implementation of the first aspect, when the battery parameter is within a preset range, the receive end controller is specifically configured to control, based on the mutual inductance or the real part of the equivalent impedance, the switch selection circuit to select N charging circuits with different power from the M charging circuits to connect to the receive end coil, where larger mutual inductance or a larger real part of the equivalent impedance indicates higher power of a charging circuit that is selected to connect to the receive end coil. The preset range of the battery parameter is a range of [X %–Y %] of a maximum value of the battery level, where X is greater than 2 and less than 5, and Y is greater than 80 and less than 95. Alternatively, the preset range of the battery parameter is a range of [a %–b %] of a rated voltage of the battery, where a is greater than 60 and less than 70, b is greater than 90 and less than 98, the maximum value of the battery level is a battery level existing when the battery is fully charged, and the rated voltage of the battery is a voltage corresponding to a case in which the battery is fully charged.

Cases in which different batteries are suitable for fast charging are different. Therefore, a range suitable for fast charging may be selected based on different features of the different batteries, to select a charging policy and path in combination with a coupling parameter, so as to ensure high efficiency of wireless charging.

According to a second aspect, an embodiment of the present disclosure provides a terminal, where the terminal includes a wireless charging apparatus and a load connected to the wireless charging apparatus. The load includes a battery and a power consumption component. The wireless charging apparatus is configured to receive energy sent by a transmit end coil of a wireless charging transmit end, to charge the battery or to supply power to the power consumption component. The wireless charging apparatus includes a receive end coil, a switch selection circuit, M charging circuits, and a receive end controller. An input end of the switch selection circuit is connected to an output end of the receive end coil, and an output end of the switch selection circuit is connected to an input end of each of the M charging circuits. Charging power of the M charging circuits is different from each other, and an output end of each of the M charging circuits is configured to connect to the battery of the terminal or another power consumption component.

The receive end controller is configured to obtain a coupling coefficient between the receive end coil and the transmit end coil, and control, based on the coupling coefficient, the switch selection circuit to select N of the M charging circuits to connect to the receive end coil, where M is an integer greater than or equal to 2, and N is an integer greater than or equal to 1 and less than or equal to M.

The terminal can accurately and effectively configure, based on a current coupling status between a transmit end coil and a receive end coil, a magnitude of a charging current of the wireless charging apparatus or of a supply current of the load by selecting and conducting charging circuits with different power, thereby obtaining higher wireless charging efficiency. In addition, when a status of a wireless charging system changes, for example, when the terminal or a transmit end moves in a charging process, the terminal may switch a charging path in time, thereby ensuring wireless charging transmission efficiency and uninterrupted transmission.

DESCRIPTION OF EMBODIMENTS

The following clearly describes the technical solutions in embodiments of the present disclosure with reference to the accompanying drawings in the embodiments of the present disclosure.

A wireless charging apparatus in the embodiments of the present disclosure is mainly applicable to various electronic devices having a wireless charging function, and is particularly applicable to some portable devices, for example, terminal products such as mobile phones, tablet computers, notebook computers, and various wearable devices, and is also applicable to electric transportation tools such as electric cars. For such terminal consumer products, a relatively high requirement on mobility is imposed, and using wireless charging can be thoroughly free from cable constraints, thereby bringing greater convenience for mobility, and significantly improving user experience.

A wireless charging system in the embodiments of the present disclosure includes a transmit end and a receive end. The transmit end is a power adapter, a wireless charger, a wireless charging cradle, or the like, and the receive end is integrated into an electronic device, configured to receive energy from the transmit end to charge a battery of the electronic device or directly supply power to the electronic device.

For ease of description, all electronic products having charging batteries or electric devices such as electric vehicles are referred to as terminals below. A main innovation of the embodiments of the present disclosure is the receive end of the wireless charging system. Therefore, the wireless charging apparatus in the embodiments of the present disclosure is the receive end. It may be understood that, the wireless charging apparatus is not limited to charger, and may be understood as an apparatus that has a wireless electric energy receiving function. Received electric energy may be used for charging, or may be directly used to supply power to a load other than a battery, for example, a power consumption component.

Figure 1:
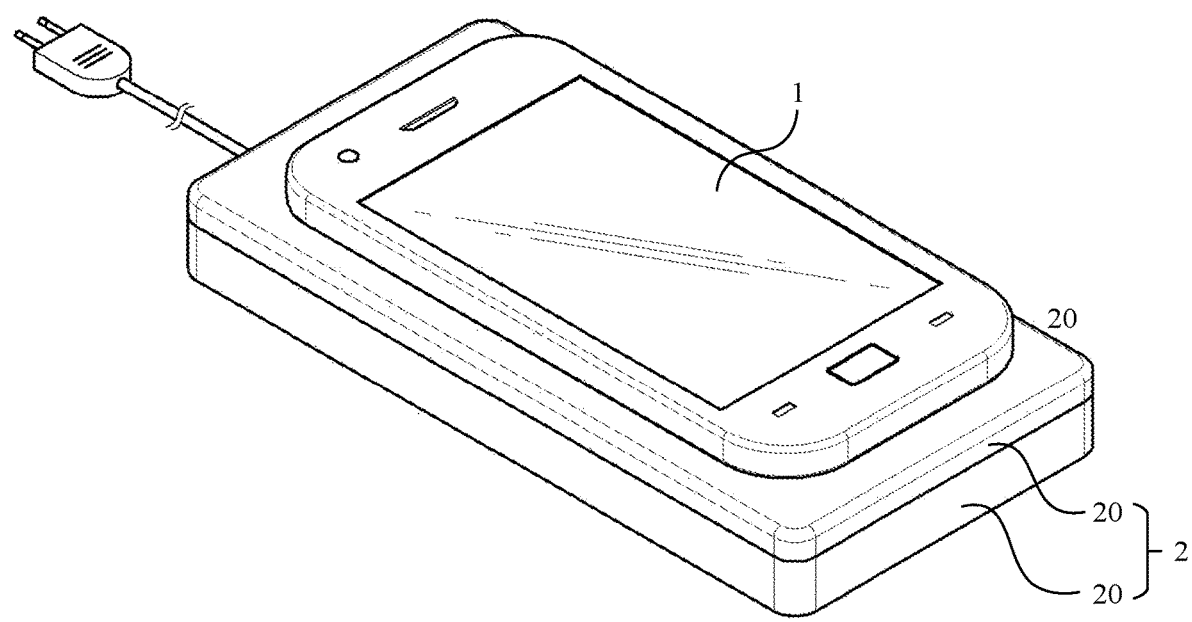
FIG. 1 is a diagram of a wireless charging system according to an embodiment of the present disclosure.

As shown in FIG. 1, a wireless charging system in an embodiment of the present disclosure includes a transmit end 2 and a terminal 1. The terminal 1 serves as a receive end, and a wireless charging apparatus is integrated in the terminal 1. The wireless charging apparatus includes a receive end power circuit 10. The transmit end 2 includes a transmit end power circuit 20 and a transmit end controller 22.

1. Transmit End

Figure 2:
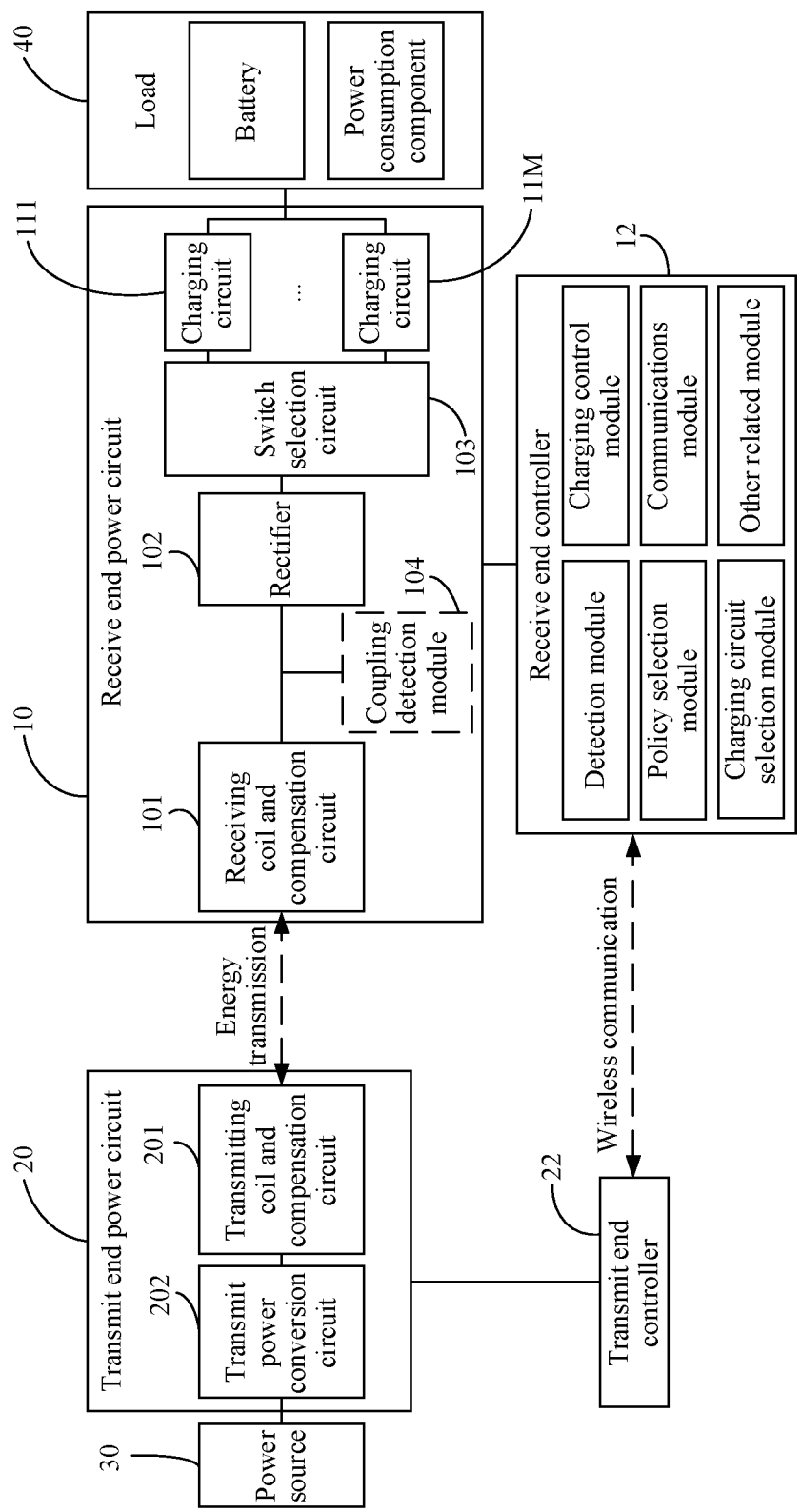
FIG. 2 is a schematic structural diagram of a wireless charging system according to an embodiment of the present disclosure.

As shown in FIG. 2, the transmit end 2 mainly includes a transmit end power circuit 20 and a transmit end controller 22. The transmit end power circuit 20 is configured to connect to a power source 30, and includes a transmit power conversion circuit 202 and a transmit end coil and compensation circuit 201. The power source is usually a direct current power source, for example, an adapter.

An input end of the transmit power conversion circuit 202 is connected to the power source 30, and an output end of the transmit power conversion circuit 202 is connected to the transmit end coil and compensation circuit 201. The transmit power conversion circuit 202 is a one-level conversion or multi-level conversion circuit, and is configured to convert a direct current voltage into a high-frequency alternating current voltage that is input to the transmit end coil and compensation circuit 201. The transmit end coil and compensation circuit 201 includes a compensation circuit part configured to adjust equivalent impedance of subsequent parts of the power conversion circuit 202 and a transmit end coil configured to generate a high-frequency magnetic field and provide energy for the receive end. In some embodiments of the present disclosure, the transmit end power circuit 20 further includes a coupling detection circuit that is serially connected between the power conversion circuit 202 and the transmit end coil and compensation circuit 201. The coupling detection circuit is configured to detect a coupling status between the transmit end coil and a receive end coil, to detect a coupling coefficient, mutual inductance, or an impedance value or a coupling coefficient refracted by the receive end into the transmit end, and send a detection output signal to the transmit end controller 22.

The transmit end controller 22 includes a detection part, a control part, and a communications part.

The detection part is configured to detect a signal, for example, configured to detect parameters such as a current of the transmit end coil, and an input voltage, an output voltage, and an output current of the power conversion circuit.

The control part is configured to control the power conversion circuit to adjust a magnitude of a current or a voltage, such as the current of the transmit end coil, an output voltage of a rectifier at the receive end, receive power at the receive end, or a charging current at the receive end.

The communications part is configured to perform information exchange on related parameters such as a control signal, a detection signal, a coupling coefficient, and mutual inductance with the receive end.

2. Receive End

As shown in FIG. 1, the wireless charging apparatus is usually mounted at the bottom of an electric vehicle or a position in the terminal 1 and close to a rear cover, receives, through the rear cover, an electromagnetic wave sent by the transmit end 2, and generates an induced current on the receive end coil through an electromagnetic mutual induction effect, thereby charging a battery of the terminal 1 or supplying power to a power consumption load of the terminal 1, where the power consumption load is an electronic element of the terminal 1, and includes, for example, a display screen, a processor, and a sensor.

As shown in FIG. 2, the wireless charging apparatus includes a receive end power circuit 10 and a receive end controller 12 that are configured to connect to a load 40. The load 40 includes a power consumption component of an electronic device, or the load 40 includes a battery and a power consumption component. For example, in the terminal, the power consumption component includes a battery, a display screen, a communications module, a circuit mainboard, a processor, and the like.

The receive end power circuit 10 includes a receive end coil and compensation circuit 101, a rectifier 102, a switch selection circuit 103, and M charging circuits 111 to 11M, where M is an integer greater than or equal to 2.

The receive end coil and compensation circuit 101 includes the receive end coil and a compensation circuit connected in series, where the receive end coil is configured to generate an induced voltage and an induced current when electromagnetic induction occurs in a high-frequency magnetic field, to receive energy. The compensation circuit is configured to adjust impedance of the receive end coil, so that the battery or another load of the terminal 1 can obtain maximum receive power.

The rectifier 102 includes an input end connected to the receive end coil and compensation circuit 101 and an output end connected to the switch selection unit 103. The rectifier is configured to convert, into a direct current voltage, a high-frequency alternating current voltage generated by the receive end coil. The rectifier 102 may be a full-bridge rectifier, an E-type rectifier, or the like.

An input end of the switch selection circuit 103 is connected to an output end of the rectifier 102, and output ends thereof are respectively connected to the M charging circuits 111 to 11M, to select one of the charging circuits to charge the battery of the terminal 1. It may be understood that, in some embodiments, the charging circuits include only a first charging circuit 111 and a second charging circuit 112 whose charging power is different from each other, to meet a requirement for more refined charging control, to improve charging efficiency and safety and to meet a requirement of some terminals for limited space. In some embodiments, there are M charging circuits, and the receive end controller 12 may control, based on the coupling coefficient, the switch selection circuit to select N of the M charging circuits to connect to the receive end coil, where N is an integer greater than or equal to 01 and less than or equal to M. An input end of each of the M charging circuits is connected to the output end of the rectifier 102 by using the switch selection circuit 103, and an output end of each charging circuit is connected to the load 40.

In some embodiments, the receive end power circuit 10 further includes a coupling detection module 104. The coupling detection module 104 is connected to an output end of the receive end coil and compensation circuit 101 and the input end of the rectifier 102, and is configured to detect a charging parameter, and send a detection output signal to the receive end controller 12, to calculate coupling parameters between the transmit end coil and the receive end coil. The charging parameters are all parameters such as a voltage and a current that are related to charging efficiency or energy transmission. For example, the charging parameters include parameters such as an output current and an output voltage of the receive end coil and compensation circuit 101. It may be understood that, when the transmit end 2 is involved, the charging parameters further include parameters such as an input current and an input voltage of the transmit end coil and compensation circuit 201.

The receive end controller 12 is configured to receive a charging parameter such as a current or a voltage at the transmit end 2, or detect charging parameters such as a current and a voltage of the receive end coil, and charging parameters such as an input and output voltage of the rectifier 102 and an output voltage and an output current of the charging circuit, determine a coupling coefficient between the transmit end coil and the receive end coil based on the charging parameters, and then select charging circuits with different power based on the coupling coefficient. A higher coupling coefficient indicates higher power of a selected charging circuit. The charging parameters include voltage and current parameters such as a charging current of the receive end coil, the input and output voltage of the rectifier 102, the output voltage and the output current of the charging circuit. It may be understood that, in some embodiments, the coupling detection module 104 is not on the receive end power circuit 10, but is integrated into the receive end controller 12, so that the receive end controller 12 has a function of detecting the charging parameters.

The receive end controller 12 calculates the coupling coefficient between the receive end coil and the transmit end coil based on the detected related charging parameters, selects, based on the coupling coefficient, a battery parameter, a mapping table, and the like, charging policies corresponding to different coupling parameters and battery parameters, then controls, based on the charging policies, the switch selection circuit to select N of the M charging circuits to connect to the receive end coil, where N is an integer greater than or equal to 1 and less than or equal to M. The receive end controller 12 includes modules related to wireless charging control, such as a detection module, a policy selection module, a charging circuit selection module, a charging control module, and a communications module. The battery parameter includes a battery level or a battery voltage.

The detection module detects the charging parameters of the wireless charging apparatus, and determines the coupling parameter between the transmit end coil and the receive end coil.

The policy selection module selects a charging policy and a charging control parameter based on the coupling parameter.

The charging circuit selection module selects a corresponding charging circuit based on the charging policy, that is, selects, based on charging power at each stage that is defined by the charging policy, a charging circuit corresponding to the charging power, to charge the battery or supply power to the load.

The charging control module sends a current or voltage adjustment instruction to the transmit end 2 based on the charging policy and by using the communications module, so that the transmit end performs corresponding adjustment based on the charging policy, and may further configure, by using the charging control module, a chip related to battery management. In this way, the wireless charging apparatus can obtain required charging power at different moments and in different cases.

3. Determine a Coupling Parameter and a Charging Policy

According to the wireless charging apparatus and method, and the terminal using same in the embodiments of the present disclosure, a coupling status between a receive end and a transmit end is detected, a corresponding charging mode or policy is adjusted based on the coupling status, and a corresponding charging circuit is switched based on the charging mode to perform charging, thereby ensuring fast charging and achieving same safety as common charging.

The coupling status between the transmit end coil and the receive end coil depends on a value of a coupling coefficient between the transmit end coil and the receive end coil. The coupling coefficient is represented by mutual inductance between the transmit end coil and the receive end coil or equivalent impedance that is reflected by the receive end to the transmit end. In other words, the value of the coupling coefficient is obtained by calculating a magnitude of the mutual inductance or the equivalent resistor, to determine the coupling status.

The mutual inductance between the transmit end coil and the receive end coil and the equivalent impedance that is reflected by the receive end to the transmit end cannot be directly obtained through measurement, but can be obtained through calculation only after a voltage and a current at the receive end or the transmit end are collected.

(1) A method for calculating the equivalent impedance that is reflected by the receive end to the transmit end is as follows.

Figure 3A:
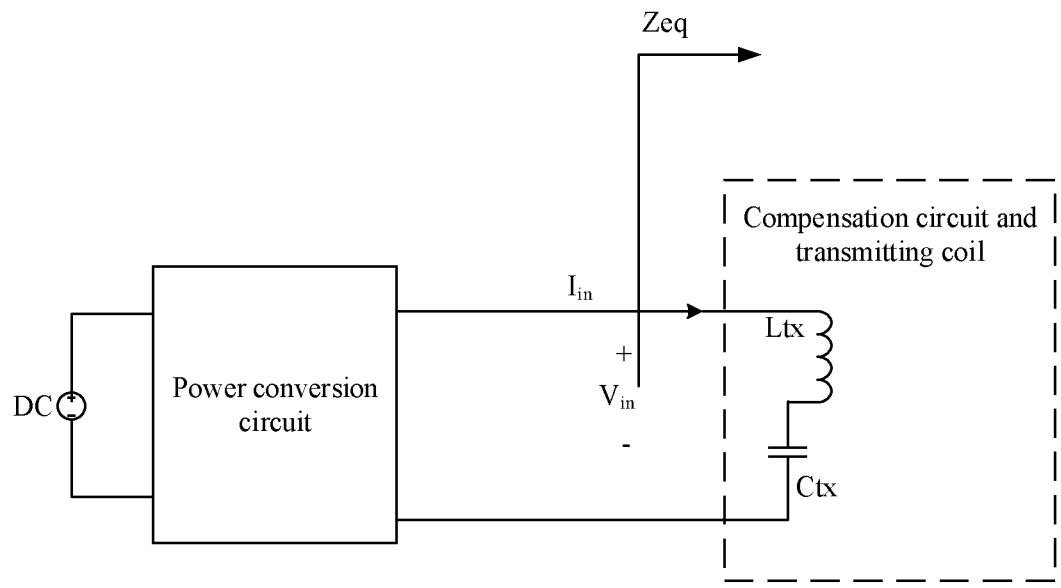
FIG. 3A is a schematic diagram of an input voltage and an input current of a transmit end coil according to an embodiment of the present disclosure.
Figure 3B:
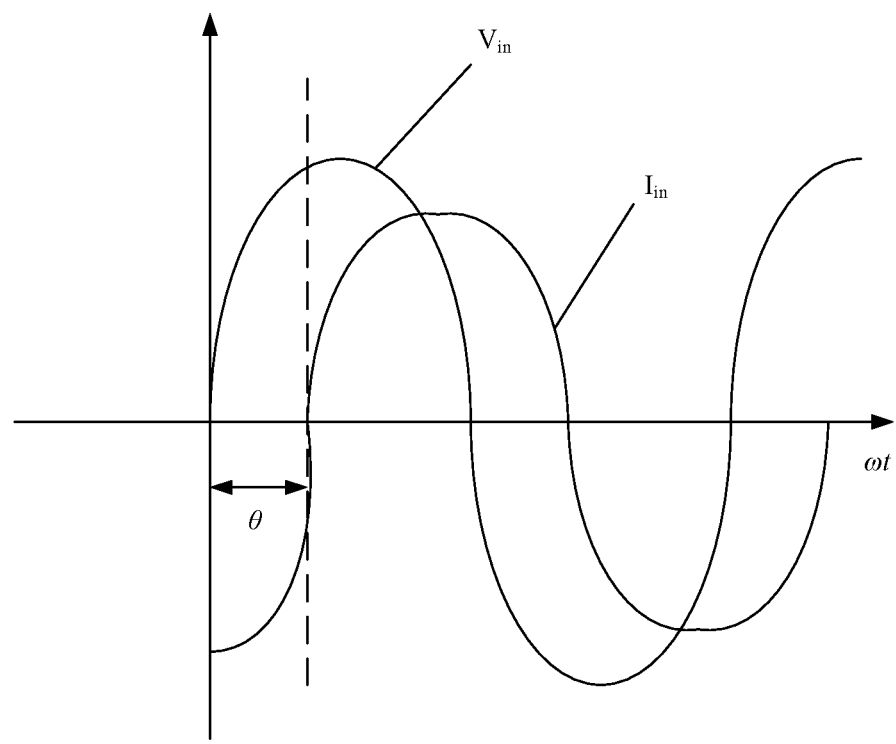
FIG. 3B is a schematic diagram of a phase difference between an input voltage and an input current of a transmit end coil according to an embodiment of the present disclosure.

As shown in FIG. 3A and FIG. 3B, if the equivalent impedance that is reflected by the receive end to the transmit end needs to be calculated, the receive end controller 12 needs to obtain related information, such as a phase difference and amplitudes, of an input voltage $V_{in}$ and an input current $I_{in}$ of the transmit end coil and compensation circuit 201. The receive end controller 12 may obtain, by communicating and interacting with the transmit end 2, related charging parameters such as the amplitudes of the input voltage $V_{in}$ and the input current $I_{in}$ of the transmit end coil and compensation circuit 201 at the transmit end 2 and the phase difference there between.

The equivalent impedance that is reflected by the receive end to the transmit end is A cos(θ)/B, where θ is the phase difference between the input voltage $V_{in}$ and the input current $V_{in}$, A is the amplitude of the input voltage $V_{in}$, and B is the amplitude of the input current $I_{in}$.

(2) A method for calculating the mutual inductance ωM between the transmit end coil and the receive end coil is as follows.

Figure 4:
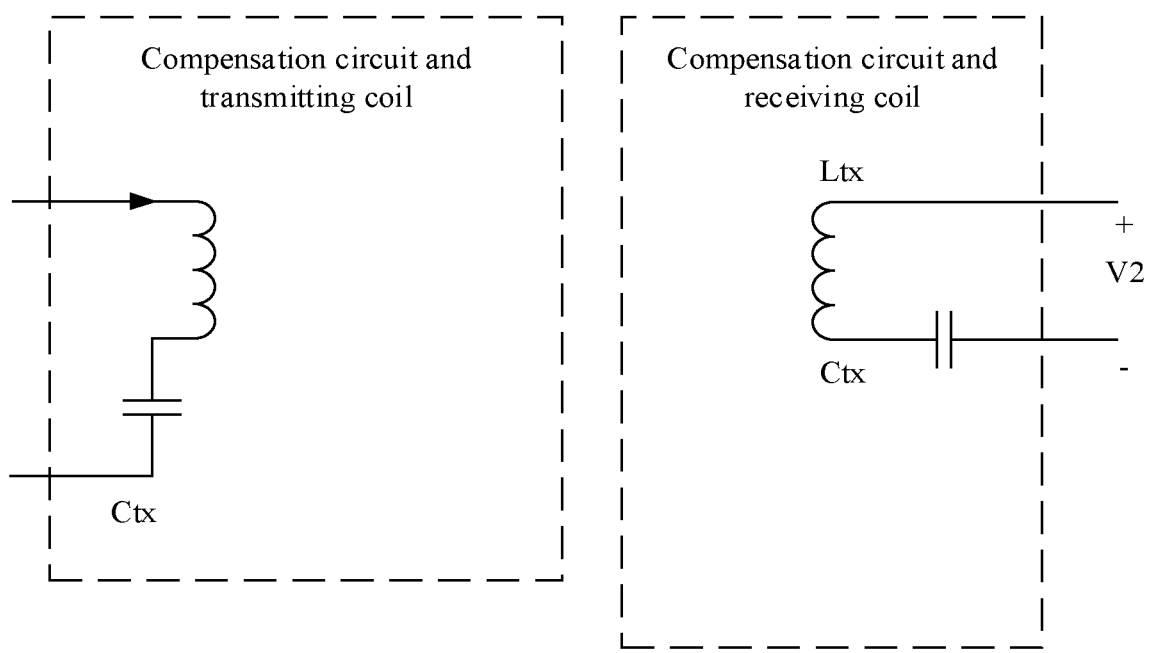
FIG. 4 is a schematic diagram of an output voltage of a receive end coil and an input current of a transmit end coil according to an embodiment of the present disclosure.

As shown in FIG. 4, the receive end controller 12 measures a peak value or a valid value of an output voltage of the receive end coil and compensation circuit 101 at the receive end 1, and obtains a peak value or a valid value of an output current of the transmit end coil and compensation circuit 201 at the transmit end 2.

When the receive end coil and a compensation capacitor in the receive end coil and compensation circuit 101 at the receive end 10 are totally resonant, the mutual inductance $$\omega M = \frac{V_2}{I_1}$$

between the transmit end coil and the receive end coil, where $V_2$ is the peak value or the valid value of the output voltage of the receive end coil and compensation circuit 101 at the receive end 10, $I_1$ is the peak value or the valid value of the output current of the transmit end coil at the transmit end 2, and $V_2$ is a sinusoidal wave. Therefore, the valid value of $V_2$ is equal to the peak value of $V_2$ divided by a square root of 2.

The charging policy in this embodiment of the present disclosure means that different charging circuits and charging power are used to charge the battery in different cases. Selection of the different charging circuits and charging power in the charging policy is mainly determined based on factors such as the coupling coefficient between the transmit end coil and the receive end coil, the battery level, a charge loop, and a battery temperature. For example, for a specific temperature threshold, charging power and a charging speed of a charging circuit are proportional to the coupling coefficient, but are inversely proportional to the battery level. That is, a higher coupling coefficient can support charging with higher power and at a faster speed. However, if the battery level is greater than a specific level that is obtained after the battery completes pre-charging, and does not exceed a limit value that exists when the battery is nearly fully charged, a lower battery level can support high-power fast charging for a longer time. For example, when parameters such as the battery system-on-chip (SOC) and a voltage of the receive end controller 12 are within a preset range, the receive end controller controls, based on the mutual inductance or the real part of the equivalent impedance, the switch selection circuit to select N charging circuits with different power from the M charging circuits to connect to the receive end coil, where larger mutual inductance or a larger real part of the equivalent impedance indicates higher power of a charging circuit that is selected to connect to the receive end coil. The preset range of the battery parameter is a range of [X %–Y %] of a maximum value of the battery level, where X is greater than 2 and less than 5, and Y is greater than 80 and less than 95. Alternatively, the preset range of the battery parameter is a range of [a %–b %] of a rated voltage of the battery, where a is greater than 60 and less than 70, and b is greater than 90 and less than 98. The maximum value of the battery level is a level existing when the battery is fully charged, and the rated voltage of the battery is a voltage corresponding to a case in which the battery is fully charged.

For example, when the battery parameter is within a preset range, the receive end controller 12 controls, based on a positive correlation relationship between a magnitude of the mutual inductance and magnitudes of charging power of the M charging circuits, the switch selection circuit to select N of the M charging circuits to connect to the receive end coil, or controls, based on a positive correlation relationship between a magnitude of the equivalent resistor and magnitudes of charging power of the M charging circuits, the switch selection circuit to select N of the M charging circuits to connect to the receive end coil.

The preset range of the battery parameter is the range of [X %–Y %] of the maximum value of the battery level, or the preset range of the battery parameter is the range of [a %–b %] of the rated voltage of the battery. The positive correlation relationship is a proportional relationship, that is, an increase in an independent variable leads to an increase in a dependent variable. Change directions of the two variables are the same. When one variable decreases or increases, the other variable also decreases or increases, where the independent variable may be understood as the coupling coefficient, and the dependent variable may be understood as the charging power. It may be understood that the positive correlation relationship further includes a piecewise function relationship. That is, when the coupling coefficient continuously changes, the charging power changes stepwise. For example, when the coupling coefficient gradually increases in a sequence of a1-a2-a3-a4-a5, corresponding charging power is b1 when the coupling coefficient is within a1-a2, corresponding charging power is b2 when the coupling coefficient is within a2-a3, corresponding charging power is b3 when the coupling coefficient is within a3-a4, corresponding charging power is b4 when the coupling coefficient is within a4-a5, and so on, where a1<a2<a3<a4<a5, and b1<b2<b3<b4.

In some embodiments of the present disclosure, for ease of description, three charging modes are used as an example. It may be understood that the embodiments of the present disclosure are not limited to the three charging modes, and more charging modes may be selected based on different situations.

Figure 5:
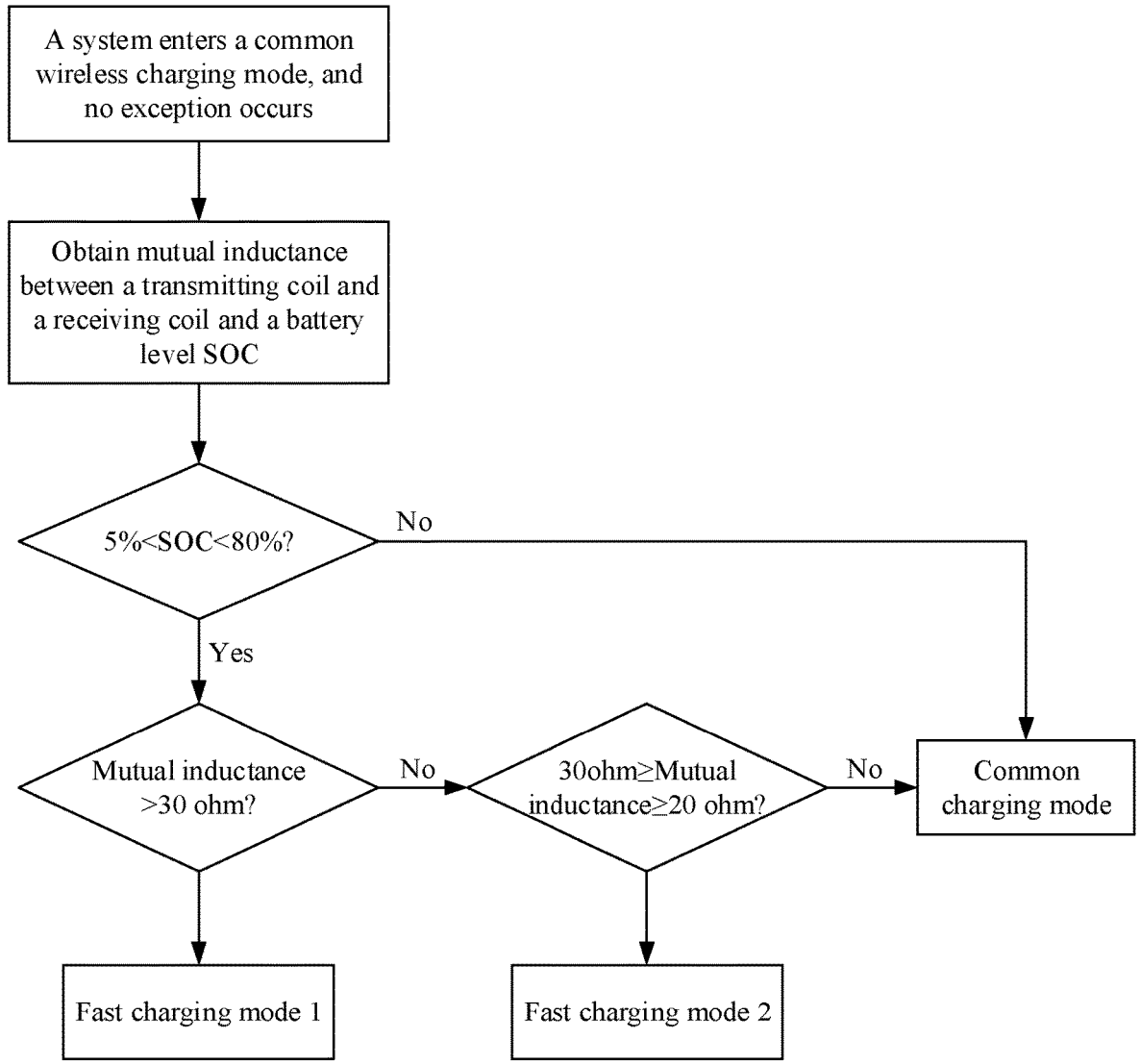
FIG. 5 is a charging control flowchart of a wireless charging apparatus according to an embodiment of the present disclosure.

Specifically, as shown in a flowchart in FIG. 5 and Table 1 below, when control is performed based on the mutual inductance between the transmit end coil and the receive end coil and the battery SOC, the wireless charging steps are as follows.

S101. After completing a handshake protocol for charging or sensing that the receive end is within a charging range and allows to be charged, the wireless charging system generally enters a common charging mode first, that is, performs common wireless charging by using standard or relatively low power.

S102. Obtain a current coupling coefficient between a transmit end coil and a receive end coil and a battery parameter, where the coupling coefficient may be mutual inductance between the transmit end coil and the receive end coil or equivalent impedance that is reflected by the receive end to the transmit end, the battery parameter includes a battery SOC or a battery voltage, and the battery SOC mainly refers to a battery capacity.

S103. Determine whether the battery parameter falls within a preset range, where the preset range is generally an range in which pre-charging is completed and a battery is nearly fully charged, preset ranges may be slightly different for different batteries and different environments, and the preset range of the battery parameter is a range of [X %–Y %] of a maximum value of the battery level or the battery voltage, where X is greater than 2 and less than 5, and Y is greater than 80 and less than 95. In some embodiments of the present disclosure, the preset range is 5%-80%. That is, whether the battery SOC meets 5%<SOC<80% is determined.

S104. If a determining result in S103 is that the battery SOC meets 5%<SOC<80%, further determine whether the coupling coefficient is greater than a preset threshold, where the preset threshold is generally a lowest limit meeting an excellent coupling degree, for example, when the coupling coefficient is the mutual inductance ωM between the transmit end coil and the receive end coil, determine whether the mutual inductance ωM is greater than 30 ohm, that is, determine whether ωM>20 ohm is met, or if a determining result in S103 is that the battery SOC does not meet 5%<SOC<80%, directly use the common charging mode.

S105. If 5%<SOC<80% is met and the coupling coefficient is greater than the preset threshold, for example, if 5%<SOC<80% and ωM>20 ohm are met, charge the battery in a fast charging mode 1 which corresponds to a first fast charging mode, if 5%<SOC<80% is met but ωM>20 ohm is not met, further determine whether 5%<SOC<80% and 15 ohm<ωM<20 ohm are met, and if 5%<SOC<80% and 15 ohm<ωM<20 ohm are met, select a fast charging mode 2, which corresponds to a second fast charging mode, to charge the battery, and if 5%<SOC<80% is met but 15 ohm<ωM<20 ohm is not met, select the common charging mode for charging. Charging power in the first fast charging mode corresponding to the fast charging mode 1 is higher than charging power in the second fast charging mode corresponding to the fast charging mode 2.

TABLE 1

| Determining condition | Charging mode | Charging current range | Target range of an output voltage of a rectifier | Charging path |
|---|---|---|---|---|
| ωM > 30 ohm and 5% < SOC < 80% | Fast charging mode 1 | 2.9-3.1 amps (A) | | Fast charging circuit |
| 20 ohm ≤ ωM ≤ 30 ohm and 5% < SOC < 80% | Fast charging mode 2 | 1.9-2.1 A | | Fast charging circuit |
| 15 ohm < ωM < 20 ohm or SOC ≥ 80% or SOC ≤ 5% | Common charging mode | 1 A | 5-12 V | Common charging circuit |
| ωM ≤ 15 ohm or SOC = 100% | No charging | | | |

Figure 6:
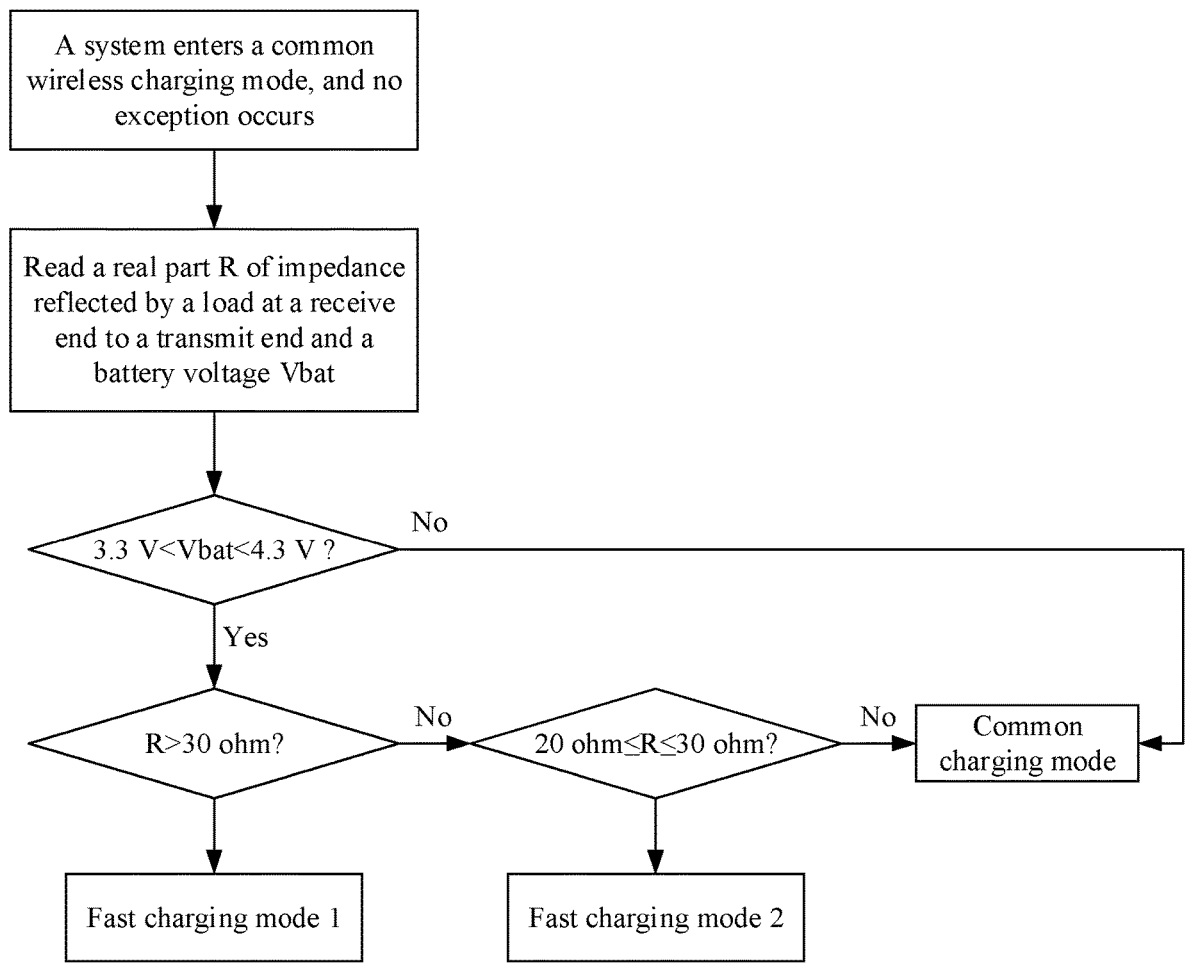
FIG. 6 is another charging control flowchart of a wireless charging apparatus according to an embodiment of the present disclosure.

As shown in a flowchart in FIG. 6 and Table 1 above, when coupling is determined based on the real part of impedance that is reflected by the receive end to the transmit end, and control is performed based on the battery voltage.

The wireless charging steps are as follows.

S201. After charging is connected or sensing that the receive end is within a charging range and allows to be charged, the wireless charging system generally enters a common charging mode first, that is, performs common wireless charging by using standard or relatively low power.

S202. Obtain a current coupling coefficient between a transmit end coil and a receive end coil and a battery parameter, where the coupling coefficient is an equivalent impedance R that is reflected by the receive end to the transmit end, and the battery parameter is a battery voltage.

S203. Determine whether the battery parameter falls within a preset range, where the preset range is generally a range in which pre-charging is completed and a battery is nearly fully charged, preset ranges may be slightly different for different batteries and different environments, and the preset range of the battery parameter is a range of [a %–b %] of a battery rated voltage $V_{bat}$, where a is greater than 60 and less than 70, and b is greater than 90 and less than 98. In some embodiments of the present disclosure, the preset range is 3.3 to 4.3. That is, whether the battery voltage Vbat meets 3.3<Vbat<4.3 volts is determined.

S204. If a determining result in S203 is that the battery voltage Vbat meets 3.3<Vbat<4.3 volts, further determine whether the coupling coefficient is greater than a preset threshold, where the preset threshold is generally a lowest limit meeting an excellent coupling degree, for example, when the coupling coefficient is the equivalent impedance R that is reflected by the receive end to the transmit end, determine whether R>30 ohm, or if a determining result in S203 is that the battery voltage Vbat does not meet 3.3<Vbat<4.3 volts, directly use the common charging mode.

S205. Select a fast charging mode if the battery voltage Vbat meets 3.3<Vbat<4.3 volts and the coupling coefficient is greater than the preset threshold. For example, if the battery voltage Vbat meets 3.3<Vbat<4.3 volts and R>30 ohm, the battery is charged in a fast charging mode 1 which corresponds to a first fast charging mode.

If the battery voltage Vbat meets 3.3<Vbat<4.3 volts but does not meet R>30 ohm, whether 3.3<Vbat<4.3 volts and 20 ohm≤R≤30 ohm are met is further determined. If 3.3<Vbat<4.3 volts and 20 ohm≤R≤30 ohm are met, a fast charging mode 2, which corresponds to a second fast charging mode, is selected to charge the battery. Charging power in the first fast charging mode corresponding to the fast charging mode 1 is higher than charging power in the second fast charging mode corresponding to the fast charging mode 2.

If 3.3<Vbat<4.3 volts is met, but 20 ohm≤R≤30 ohm is not met, the common charging mode is selected for charging.

It may be understood that in some embodiments, for different combinations of the coupling coefficient and the battery parameter, there are different implementations. However, their determining principles and control policies are similar to those in S101 to S105 and S201 to S205. For brevity, details are not enumerated herein again.

For example, the wireless charging apparatus may set a fast charging current range to be 2.9-3.1 A. In this case, the receive end controller 12 detects an actual charging current of the battery, and compares the fast charging current range with an actual charging current range.

If the actual charging current is greater than the upper limit 3.1 A, through wireless communication, the transmit end controller 22 is enabled to reduce an output voltage of a direct current (DC)/DC circuit by a step size of 100 millivolts (mV), to reduce a transmit current, and finally reduce the actual charging current at the receive end 1.

If the actual charging current is less than the lower limit 2.9 A, through wireless communication, the transmit end controller 22 is enabled to improve an output voltage of a DC/DC circuit by a step size of 100 mV, to improve a transmit current, and finally improve the actual charging current at the receive end 1.

When the actual charging current falls within a target range, no adjustment is performed.

In addition, in a charging process, the wireless charging apparatus further constantly detects the real part of the impedance that is reflected by the receive end to the transmit end and the battery voltage, to determine whether the charging mode needs to be changed.

It is assumed that in the charging process, the receive end is moved relative to the transmit end. In this case, if it is detected that a real part of impedance reflected by a load at the receive end to the transmit end is less than 10 ohm, charging is stopped and an alarm is given.

If the receive end is moved not far, and a condition that the real part of the impedance reflected by the receive end to the transmit end is greater than 10 ohm and less than 20 ohm is met or the battery voltage is charged to 4.3 volts (V), the common charging mode is changed to. In this case, the receive end controller controls a switch S2 to be turned on, and S1 to be turned off, and a common charging circuit works.

In this case, a target of the wireless charging apparatus changes to controlling an output voltage range of the rectifier 102 to be within a range of 5-12 V, and the receive end controller detects an output voltage of the rectifier, and compares the output voltage with the target voltage range.

Assuming that an actual output voltage of the rectifier 102 at the receive end is greater than the upper limit 12 V, through wireless communication, the transmit end controller 22 is enabled to decrease an output voltage of a DC\DC circuit by a step size of 100 mV, to reduce a transmit current, and finally decrease the actual output voltage of the rectifier 102 at the receive end, where the transmit power conversion circuit 202 at the transmit end 2 includes a DC/alternating current (AC) circuit and the DC/DC circuit.

If the actual output voltage of the rectifier 102 is less than the lower limit 5 V, through wireless communication, the transmit end controller 22 is enabled to improve an output voltage of a DC/DC circuit by a step size of 100 mV, to improve a transmit current, and finally improve the actual charging voltage of the rectifier 102 at the receive end.

When the actual output voltage of the rectifier 102 at the receive end falls within a target range, no adjustment is performed.

According to a wireless charging control method used by the wireless charging apparatus provided in this embodiment, the coupling status between the transmit end coil and the receive end coil is determined based on a current charging parameter of the wireless charging system, so that whether fast charging can be performed can be accurately determined in real time, and a charging current magnitude of the wireless charging system can be accurately and effectively configured. In the wireless charging system, a fast charging circuit at the receive end 1 uses a DC/DC converter with a fixed conversion ratio, so that wireless charging efficiency is higher, and higher charging power is supported. When a status of the wireless charging system changes, for example, when a charging device moves in the charging process, the wireless charging system may switch a charging path in time, to ensure that charging is not interrupted.

4. Circuit Implementation

Figure 7:
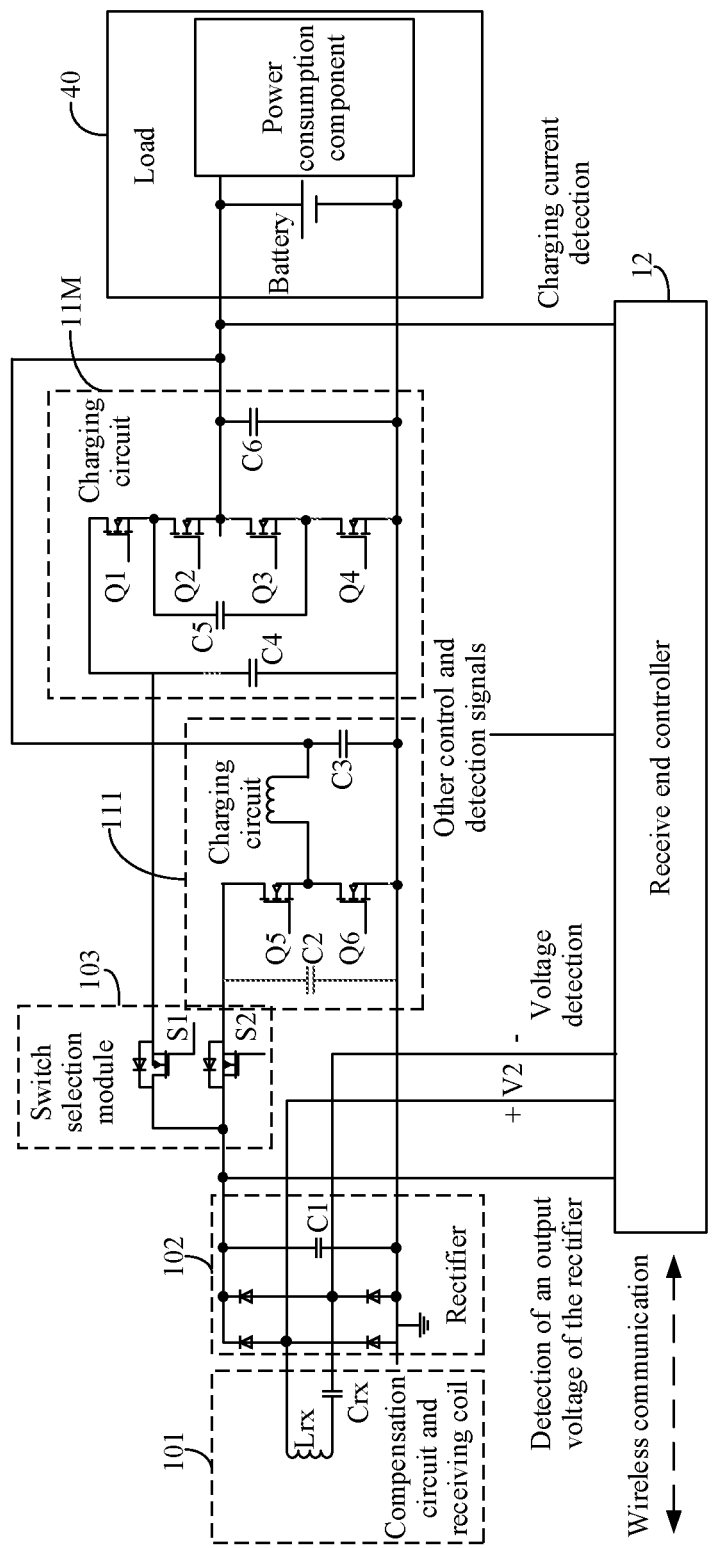
FIG. 7 is a schematic circuit diagram of a wireless charging apparatus according to an embodiment of the present disclosure.

The receive end power circuit 10 shown in FIG. 7 corresponds to several major parts at the receive end 1 of the wireless charging apparatus shown in FIG. 2, including the receive end controller 12, and the receive end coil and compensation circuit 101, the rectifier 102, the switch selection circuit 103, the charging circuit 111, and the charging circuit 11M that are included in the receive end power circuit 10. A receive end 1 in FIG. 7 is correspondingly the same as the receive end 1 in FIG. 2. However, for ease of description and clarity of display, only two charging circuits with different power are shown in FIG. 7, namely, the charging circuit 111 and the charging circuit 11M, but other charging circuits are not shown in FIG. 7. For the switch selection unit 103, also, only two switching diodes S1 and S2 are displayed, and not all switching diodes are displayed. It may be understood that the switching diode may be any semiconductor transistor or another component that implements a switch selection function, or may be any circuit or element combination. It may be understood that, a quantity of switching diodes and a quantity of charging circuits that are shown in FIG. 7 cannot be used as a limitation on this embodiment of the present disclosure. This embodiment of the present disclosure is not limited to a case in which there are only two switching diodes and two charging circuits, and may be properly applied to a case in which the quantities are greater than 2.

The receive end coil and compensation circuit 101 includes a receive end coil Lrx and a compensation capacitor Crx connected in series, where one end of the receive end coil Lrx and one end of the compensation capacitor Crx are connected together, the other end of the receive end coil Lrx and the other end of the compensation capacitor Crx are separately connected to two output ends of the receive end coil and compensation circuit 101.

The rectifier 102 includes two diode bridge arms connected in parallel with each other and a rectifier capacitor C1, where two ends of each diode bridge arm and two ends of the rectifier capacitor C1 are correspondingly connected to two output ends of the rectifier 102 separately. Each diode bridge arm includes two diodes D connected in series with each other. The two output ends of the receive end coil and compensation circuit 101 are respectively connected to middle points of the two bridge arms. The middle point is a point connected to two diodes D on each diode bridge arm.

The switch selection circuit 103 includes two switching transistors S1 and S2, where one end of S1 and one end of S2 are both connected to one output end of the rectifier 102, the other end of S1 is connected to the charging circuit 11M, and the other end of S2 is connected to the charging circuit 111. In some embodiments, there are M charging circuits, there are also M switching transistors, and a manner of connecting each charging circuit is similar to that of S1 or S2, to correspondingly control conduction and disconnection of each switching transistor and the receive end coil.

Charging power of the charging circuit 111 is different from charging power of the charging circuit 11M. In this embodiment, the charging power of the charging circuit 111 is lower than the charging power of the charging circuit 11M. For example, the charging circuit 111 is a common charging circuit corresponding to common charging power, and the charging circuit 11M is a fast charging circuit corresponding to relatively high charging power.

The charging circuit 111 includes two switching diodes Q5 and Q6 connected in series with each other, an inductor L, and two charging capacitors C2 and C3. One end of the two Q5 and Q6 that are connected in series with each other is connected to the output end of the rectifier 102 by using S2. That is, one end of the two Q5 and Q6 that are connected in series with each other is connected to the other end of the S2, the other end of the two Q5 and Q6 that are connected in series with each other is connected to the other output end of the rectifier 102. One end of C2 is connected to the other end of S2, and the other end of C2 is connected to the other output end of the rectifier 102. One end of C3 is connected to the other output end of the rectifier 102, and the other end of C3 is connected to the battery and a load. One end of the inductor L is connected to a connection point between Q5 and Q6, and the connection point between Q5 and Q6 is a joint that is located between Q5 and Q6 and that is connected to both Q5 and Q6. Meanings of connection points appearing in the following are similar, and for brevity, details are not described again. The other end of the inductor L is connected to the other end of C3, and is also connected to the battery and the load. A topology of the charging circuit 111 is a buck circuit that works in a closed loop state, and an input voltage may be converted, based on a preset charging policy, to a voltage/current required by the battery, to charge the battery.

The charging circuit 11M includes three charging capacitors C4, C5, and C6 and four switching diodes Q1, Q2, Q3, and Q4 connected in series with each other, and Q1 to Q4 are connected in series in a sequence of Q1, Q2, Q3, and Q4. One end of a bridge arm formed by the four Q1 to Q4 connected in series with each other is connected to the output end of the rectifier 102 through S1. That is, one end of the bridge arm of the four Q1 to Q4 connected in series with each other is connected to the other end of S1. The other end of the bridge arm of the four Q1 to Q4 connected in series with each other is connected to the other output end of the rectifier 102, and is further connected to the battery and the load. One end of C4 is connected to the other end of S2, and the other end of C4 is connected to the other output end of the rectifier 102. One end of C5 is connected to a connection point between Q1 and Q2, and the other end of C5 is connected to a connection point between Q3 and Q4. One end of C6 is connected to a joint between Q2 and Q3, the end of C6 is connected to both the battery and one end of the load, and the end of C6 is further connected to both the other end of the inductor L and the other end of C3. The other end of C6 is connected to the battery and the other end of the load, and the other end of C6 is further connected to the other end of C2 and the other output end of the rectifier 102.

The charging circuit is a switched-capacitor circuit, where Q1 and Q3 are alternately connected to Q2 and Q4, to implement a voltage conversion ratio of 2:1.

The receive end controller 12 is configured to detect charging parameters such as an output voltage of the receive end coil and compensation circuit 101, an output voltage of the rectifier 102, and an input voltage of the battery and the load. The receive end controller 12 is further configured to perform wireless communication with the transmit end 2, to obtain a control signal, and charging parameters such as an input voltage and an input current of the transmit end coil and compensation circuit 201 that are from the transmit end 2. In some embodiments, the coupling detection module 104 is integrated into the receive end controller 12, and is configured to detect the charging parameters of the receive end power circuit 10.

Figure 8:
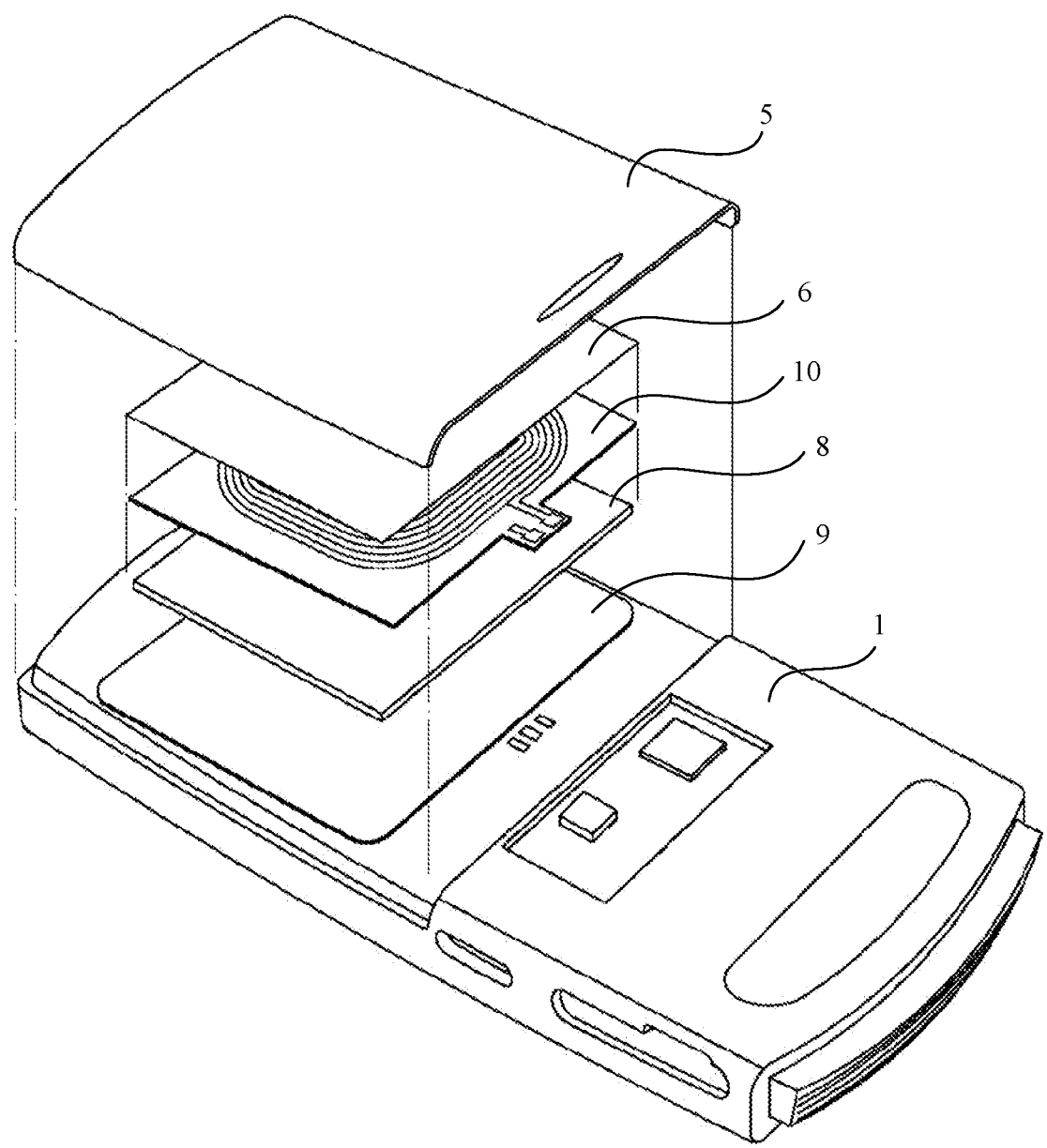
FIG. 8 is a schematic structural diagram of a terminal according to an embodiment of the present disclosure.

As shown in FIG. 8, in some embodiments, a wireless charging apparatus in the present disclosure is applied to a terminal 1. The terminal 1 includes a rear cover 5 of the terminal, a receive end power circuit 10, an electromagnetic shielding plate 8, and a battery 9. The receive end power circuit 10 is mounted at a position in the terminal 1 and close to the rear cover 5, and a receive end coil clamp of the receive end power circuit 10 is fastened between the rear cover 5 and the electromagnetic shielding plate 8 by using a mounting film 6, so as to receive, by using the rear cover, electromagnetic energy sent by a transmit end 2, and also prevent, by using the electromagnetic shielding plate 8, electromagnetic radiation on a receive end coil from affecting another power consumption component of the terminal 1.

It may be clearly understood by a person skilled in the art that for the purpose of convenient and brief description, for a detailed working process of the described system, apparatus, and unit, refer to a corresponding process in the foregoing method embodiments.

The foregoing descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure is subject to the protection scope of the appended claims.

What is claimed is:

1. A wireless charging apparatus, located in an electronic device and configured to receive energy from a transmit end coil of a wireless charging transmit end, wherein the wireless charging apparatus comprises:
   a receive end coil comprising an output end;
   a rectifier comprising:
     an input end coupled to the output end of the receive end coil;
     a first output end; and
     a second output end;
   a switch selection circuit comprising:
     an input end coupled to the first output end of the rectifier; and
     an output end;
   M charging circuits comprising:
     an input end coupled to the output end of the switch selection circuit; and
     an output end coupled to a load of the electronic device, wherein a charging power of each of the M charging circuits is different from each other; and
   a receive end controller coupled to the M charging circuits, the receive end coil, and the load, wherein the receive end controller is configured to:
     obtain a coupling coefficient between the receive end coil and the transmit end coil based on a charging parameter of the receive end coil and the transmit end coil, wherein the coupling coefficient comprises a mutual inductance between the transmit end coil and the receive end coil;
     control, based on the coupling coefficient and a battery parameter of a battery of the load, the switch selection circuit to select N charging circuits of the M charging circuits to connect to the receive end coil using the rectifier, wherein the battery parameter comprises a battery level or a battery voltage, wherein M is an integer greater than or equal to 2, and wherein N is an integer greater than or equal to 1 and less than or equal to M; and
     control, based on a positive correlation relationship between a first magnitude of the mutual inductance and magnitudes of the charging power of the M charging circuits, the switch selection circuit to select the N charging circuits of the M charging circuits to connect to the receive end coil using the rectifier when the battery parameter is within a preset range,
   wherein the preset range of the battery parameter is a range of [X percent (%)–Y %] of a maximum value of the battery level,
   wherein X is greater than 2 and less than 5, and
   wherein Y is greater than 80 and less than 95.

2. The wireless charging apparatus of claim 1, wherein when the battery parameter is within the preset range, the receive end controller is further configured to control, based on a real part of an equivalent impedance, the switch selection circuit to select the N charging circuits with a different power from the M charging circuits to connect to the receive end coil, and wherein a larger real part of the equivalent impedance indicates that a charging circuit with higher charging power is selected to connect to the receive end coil.

3. The wireless charging apparatus of claim 2, wherein the receive end controller is further configured to:
   obtain a first amplitude of an input voltage of the transmit end coil, a second amplitude of an input current of the transmit end coil, and a phase difference between the input voltage and the input current; and
   calculate the real part of the equivalent impedance as $A\cos(\theta)/B$, wherein $\theta$ is the phase difference, wherein A is the first amplitude, and wherein B is the second amplitude.

4. The wireless charging apparatus of claim 1, wherein the receive end controller is further configured to:
   obtain a first peak value of an output voltage of the receive end coil and a second peak value of an output current of the receive end coil; and
   calculate the mutual inductance between the transmit end coil and the receive end coil as being equal to the first peak value divided by the second peak value.

5. The wireless charging apparatus of claim 1, wherein the switch selection circuit comprises M switching transistors, wherein each of the M switching transistors comprises:
   a first end connected to the first output end of the rectifier; and a second end connected to one of the M charging circuits,
wherein the M switching transistors are connected to the M charging circuits in a one-to-one correspondence manner.

6. The wireless charging apparatus of claim 1, wherein one of the M charging circuits comprises:
a switching diode system comprising:
a first diode;
a second diode coupled to the first diode in series;
a first end coupled to the first output end of the rectifier using the switch selection circuit; and
a second end coupled to the second output end of the rectifier;
an inductor comprising:
a first end coupled to a connection point of the switching diode system, wherein the connection point is a joint between the first diode and the second diode and coupled to the first diode and the second diode, and
a second end;
a first charging capacitor comprising:
a first end coupled to the switch selection circuit; and
a second end coupled to the second output end of the rectifier; and
a second charging capacitor comprising:
a first end coupled to the second output end of the rectifier; and
a second end coupled to the load and the second end of the inductor.

7. The wireless charging apparatus of claim 1, wherein one of the M charging circuits comprises:
a first capacitor comprising:
a first end; and
a second end;
a second capacitor comprising:
a first end; and
a second end;
a third capacitor comprising:
a first end; and
a second end;
a first switching diode;
a second switching diode;
a third switching diode; and
a fourth switching diode,
wherein the first switching diode, the second switching diode, the third switching diode, and the fourth switching diode are coupled in series with each other in a sequence of the first switching diode, the second switching diode, the third switching diode, and the fourth switching diode and forms a bridge arm, wherein the bridge arm comprises:
a first end coupled to the first output end of the rectifier using the switch selection circuit; and
a second end coupled to the second output end of the rectifier and configured to connect to the load,
wherein the first end of the first capacitor is coupled to the switch selection circuit, wherein the second end of the first capacitor is coupled to the second output end of the rectifier, wherein the first end of the second capacitor is coupled to a first connection point between the first switching diode and the second switching diode, wherein the second end of the second capacitor is coupled to a second connection point between the third switching diode and the fourth switching diode, wherein either the first end of the third capacitor is coupled to a joint between the second switching diode and the third switching diode, or the first end of the third capacitor is coupled to an end of an inductor, and wherein the second end of the third capacitor is coupled to a common connection point between a battery of the load and one end of the load.

8. The wireless charging apparatus of claim 1, wherein the coupling coefficient comprises a mutual inductance between the transmit end coil and the receive end coil, wherein, when the battery parameter is within the preset range, the receive end controller is further configured to control, based on a positive correlation relationship between the first magnitude of the mutual inductance and a second magnitude of the charging power of the M charging circuits, the switch selection circuit to select the N of the M charging circuits to connect to the receive end coil using the rectifier wherein the preset range of the battery parameter is a range of [a %–b %] of a rated voltage of the battery, wherein a is greater than 60 and less than 70, and wherein b is greater than 90 and less than 98.

9. The wireless charging apparatus of claim 1, wherein the coupling coefficient comprises a mutual inductance between the transmit end coil and the receive end coil, and wherein, when the battery parameter is within the preset range, the receive end controller is further configured to control, based on a positive correlation relationship between a third magnitude of an equivalent resistor and a fourth magnitude of the charging power of the M charging circuits, the switch selection circuit to select the N of the M charging circuits to connect to the receive end coil using the rectifier.

10. The wireless charging apparatus of claim 1, wherein the coupling coefficient comprises a mutual inductance between the transmit end coil and the receive end coil, wherein, when the battery parameter is within the preset range, the receive end controller is further configured to control, based on a positive correlation relationship between a third magnitude of an equivalent resistor and a fourth magnitude of the charging power of the M charging circuits, the switch selection circuit to select N of the M charging circuits to connect to the receive end coil using the rectifier, wherein the preset range of the battery parameter is a range of [a %–b %] of a rated voltage of the battery, wherein a is greater than 60 and less than 70, and wherein b is greater than 90 and less than 98.

11. The wireless charging apparatus of claim 1, wherein the coupling coefficient comprises a real part of an equivalent impedance from the wireless charging apparatus to the wireless charging transmit end, and wherein, when the battery parameter is within the preset range, the receive end controller is further configured to control, based on a positive correlation relationship between a second magnitude of an equivalent resistor and the magnitudes of the charging power of the M charging circuits, the switch selection circuit to select the N of the M charging circuits to connect to the receive end coil by using the rectifier.

12. The wireless charging apparatus of claim 1, wherein the coupling coefficient comprises a real part of an equivalent impedance from the wireless charging apparatus to the wireless charging transmit end, wherein, when the battery parameter is within the preset range, the receive end controller is further configured to control, based on a positive correlation relationship between a second magnitude of an equivalent resistor and the magnitudes of the charging power of the M charging circuits, the switch selection circuit to select the N of the M charging circuits to connect to the receive end coil by using the rectifier, wherein the preset range of the battery parameter is a range of [a %–b %] of a rated voltage of the battery, wherein a is greater than 60 and less than 70, and wherein b is greater than 90 and less than 98.

13. The wireless charging apparatus of claim 1, wherein when the battery parameter is within the preset range, the receive end controller is further configured to control, based on a real part of an equivalent impedance, the switch selection circuit to select the N charging circuits with a different power from the M charging circuits to connect to the receive end coil, wherein a larger real part of the equivalent impedance indicates that a charging circuit with higher charging power is selected to connect to the receive end coil, wherein the preset range of the battery parameter is a range of [a %–b %] of a rated voltage of the battery, wherein a is greater than 60 and less than 70, and wherein b is greater than 90 and less than 98.

14. The wireless charging apparatus of claim 1, wherein when the battery parameter is within the preset range, the receive end controller is further configured to control, based on a mutual inductance, the switch selection circuit to select the N charging circuits with a different power from the M charging circuits to connect to the receive end coil, and wherein a larger mutual inductance indicates that a charging circuit with higher charging power is selected to connect to the receive end coil.

15. The wireless charging apparatus of claim 1, wherein the receive end controller is further configured to:
obtain a first valid value of an output voltage of the receive end coil and a second valid value of an output current of the receive end coil; and
calculate the mutual inductance between the transmit end coil and the receive end coil as being equal to the first valid value divided by the second valid value.

16. The wireless charging apparatus of claim 1, wherein the receive end controller is further configured to control the switch selection circuit based on a mapping table.

17. A terminal comprising:
a wireless charging apparatus; and
a load coupled to the wireless charging apparatus and comprising either a battery or a power consumption component,
wherein the wireless charging apparatus is configured to receive energy from a transmit end coil of a wireless charging transmit end, wherein the wireless charging apparatus comprises:
a receive end coil comprising an output end;
a rectifier comprising:
an input end coupled to the output end of the receive end coil;
a first output end; and
a second output end;
a switch selection circuit comprising:
an input end coupled to the output end of the rectifier; and
an output end;
M charging circuits comprising:
an input end coupled to the output end of the switch selection circuit; and
an output end coupled to the load, wherein a charging power of each of the
M charging circuits is different from each other; and
a receive end controller coupled to the M charging circuits, the receive end coil, and the load, wherein the receive end controller is configured to:
obtain a coupling coefficient between the receive end coil and the transmit end coil based on a charging parameter of the receive end coil and the transmit end coil; [and]
control, based on the coupling coefficient and a battery parameter of the battery of the load, the switch selection circuit to select N charging circuits of the M charging circuits to connect to the receive end coil using the rectifier, wherein the battery parameter comprises a battery voltage or a battery level, wherein M is an integer greater than or equal to 2, and wherein N is an integer greater than or equal to 1 and less than or equal to M; and
control, based on a real part of an equivalent impedance, the switch selection circuit to select the N charging circuits with a different power from the M charging circuits to connect to the receive end coil when the battery parameter is within a preset range, wherein a larger real part of the equivalent impedance indicates that a charging circuit with higher charging power is selected to connect to the receive end coil, wherein the preset range of the battery parameter is a range of [X percent (%)–Y %] of a maximum value of the battery level,
wherein X is greater than 2 and less than 5, and
wherein Y is greater than 80 and less than 95.

18. The wireless charging apparatus of claim 17, wherein the receive end controller is further configured to control the switch selection circuit based on a mapping table.

19. The wireless charging apparatus of claim 17, wherein the switch selection circuit comprises M switching transistors.

20. A wireless charging apparatus, located in an electronic device and configured to receive energy from a transmit end coil of a wireless charging transmit end, wherein the wireless charging apparatus comprises:
a receive end coil comprising an output end;
a rectifier comprising:
an input end coupled to the output end of the receive end coil;
a first output end; and
a second output end;
a switch selection circuit comprising:
an input end coupled to the first output end of the rectifier; and
an output end;
M charging circuits comprising:
an input end coupled to the output end of the switch selection circuit; and
an output end coupled to a load of the electronic device, wherein a charging power of each of the M charging circuits is different from each other; and
a receive end controller coupled to the M charging circuits, the receive end coil, and the load, wherein the receive end controller is configured to:
obtain a coupling coefficient between the receive end coil and the transmit end coil based on a charging parameter of the receive end coil and the transmit end coil, wherein the coupling coefficient comprises a mutual inductance between the transmit end coil and the receive end coil;
control, based on the coupling coefficient and a battery parameter of a battery of the load, the switch selection circuit to select N charging circuits of the M charging circuits to connect to the receive end coil using the rectifier, wherein the battery parameter comprises a battery level or a battery voltage, wherein M is an integer greater than or equal to 2, and wherein N is an integer greater than or equal to 1 and less than or equal to M; and control, based on the mutual inductance, the switch selection circuit to select the N charging circuits with a different power from the M charging circuits to connect to the receive end coil when the battery parameter is within a preset range, wherein a larger mutual inductance indicates that a charging circuit with higher charging power is selected to connect to the receive end coil, wherein the preset range of the battery parameter is a range of [a %–b %] of a rated voltage of the battery, wherein a is greater than 60 and less than 70, and wherein b is greater than 90 and less than 98.

* * * * *

UNITED STATES PATENT AND TRADEMARK OFFICE
CERTIFICATE OF CORRECTION

| | | |
|---|---|---|
| PATENT NO. | : 12,500,449 B2 | Page 1 of 1 |
| APPLICATION NO. | : 17/113328 | |
| DATED | : December 16, 2025 | |
| INVENTOR(S) | : Qitang Liu et al. | |

It is certified that error appears in the above-identified patent and that said Letters Patent is hereby corrected as shown below:

In the Claims

Claim 17, Column 20, Line 4: "end coil; [and]" should read "end coil;".

Signed and Sealed this
Twenty-seventh Day of January, 2026

John A. Squires
*Director of the United States Patent and Trademark Office*